US008838385B2

(12) United States Patent
Van Wiemeersch

(10) Patent No.: US 8,838,385 B2
(45) Date of Patent: Sep. 16, 2014

(54) METHOD AND APPARATUS FOR VEHICLE ROUTING

(75) Inventor: John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 364 days.

(21) Appl. No.: 13/330,867

(22) Filed: Dec. 20, 2011

(65) Prior Publication Data

US 2013/0158870 A1    Jun. 20, 2013

(51) Int. Cl.
*G01C 21/00* (2006.01)

(52) U.S. Cl.
USPC ........ 701/527; 701/22; 320/109; 180/65.265; 903/903; 700/291

(58) Field of Classification Search
CPC .............. G08G 1/096844; Y02T 10/7005; Y02T 10/7088; Y02T 90/128; Y02T 90/14; Y02T 90/16
USPC ............... 701/22; 320/109; 455/127.1, 343.1; 700/291; 180/65.265; 903/903
See application file for complete search history.

(56) References Cited

U.S. PATENT DOCUMENTS

| | | | |
|---|---|---|---|
| 4,937,751 A | 6/1990 | Nimura et al. | |
| 5,177,685 A | 1/1993 | Davis et al. | |
| 5,220,507 A | 6/1993 | Kirson | |
| 5,275,474 A | 1/1994 | Chin et al. | |
| 5,291,412 A | 3/1994 | Tamai et al. | |
| 5,351,779 A | 10/1994 | Yamashita | |
| 5,394,332 A | 2/1995 | Kuwahara et al. | |
| 5,406,491 A | 4/1995 | Lima | |
| 5,406,492 A | 4/1995 | Suzuki | |
| 5,487,002 A | 1/1996 | Diller et al. | |
| 5,578,748 A | 11/1996 | Brehob et al. | |
| 5,742,922 A | 4/1998 | Kim | |
| 5,767,795 A | 6/1998 | Schaphorst | |
| 5,790,973 A | 8/1998 | Blaker et al. | |

(Continued)

FOREIGN PATENT DOCUMENTS

| | | |
|---|---|---|
| CN | 1573296 | 2/2005 |
| DE | 102005029744 | 12/2006 |

(Continued)

OTHER PUBLICATIONS

International Searching Authority, International Search Report and the Written Opinion for the corresponding PCT Application No. PCT/US2009/69668 mailed Mar. 4, 2010.

(Continued)

*Primary Examiner* — Gertrude Arthur Jeanglaude
(74) *Attorney, Agent, or Firm* — Jennifer M. Stec; Brooks Kushman P.C.

(57) ABSTRACT

A computer implemented method includes receiving a vehicle route. The method further includes receiving data relating to a vehicle charge level. Also, the method includes estimating a power requirement required to travel the length of the vehicle route. The method additionally includes contingent on a vehicle charge state being insufficient to meet the power requirement, comparing the vehicle route to power outage data to establish the presence of power outage regions along the vehicle route. Further, the method includes sending a warning for at least one portion of the route containing a power outage region to a vehicle computing system for relay to a driver.

20 Claims, 4 Drawing Sheets

(56) References Cited

U.S. PATENT DOCUMENTS

| | | |
|---|---|---|
| 5,802,492 A | 9/1998 | DeLorme et al. |
| 5,848,364 A | 12/1998 | Ohashi |
| 5,901,806 A | 5/1999 | Takahashi |
| 6,005,494 A | 12/1999 | Schramm |
| 6,028,537 A | 2/2000 | Suman et al. |
| 6,101,443 A | 8/2000 | Kato et al. |
| 6,314,369 B1 | 11/2001 | Ito et al. |
| 6,374,177 B1 | 4/2002 | Lee et al. |
| 6,401,034 B1 | 6/2002 | Kaplan et al. |
| 6,424,363 B1 | 7/2002 | Matsuba et al. |
| 6,424,888 B1 | 7/2002 | Sone et al. |
| 6,427,115 B1 | 7/2002 | Sekiyama |
| 6,427,117 B1 | 7/2002 | Ito et al. |
| 6,462,676 B1 | 10/2002 | Koizumi |
| 6,484,092 B2 | 11/2002 | Seibel |
| 6,484,093 B1 | 11/2002 | Ito et al. |
| 6,487,477 B1 | 11/2002 | Woestman et al. |
| 6,532,372 B1 | 3/2003 | Hwang |
| 6,533,367 B1 | 3/2003 | Latarnik et al. |
| 6,574,538 B2 | 6/2003 | Sasaki |
| 6,574,551 B1 | 6/2003 | Maxwell et al. |
| 6,608,887 B1 | 8/2003 | Reksten et al. |
| 6,691,025 B2 | 2/2004 | Reimer |
| 6,791,471 B2 | 9/2004 | Wehner et al. |
| 6,829,529 B2 | 12/2004 | Trefzer et al. |
| 6,834,229 B2 | 12/2004 | Rafiah et al. |
| 6,866,349 B2 | 3/2005 | Sauter et al. |
| 6,904,362 B2 | 6/2005 | Nakashima et al. |
| 6,999,779 B1 | 2/2006 | Hashimoto |
| 7,053,866 B1 | 5/2006 | Mimran |
| 7,082,443 B1 | 7/2006 | Ashby |
| 7,089,110 B2 | 8/2006 | Pechatnikov et al. |
| 7,113,107 B2 | 9/2006 | Taylor |
| 7,167,799 B1 | 1/2007 | Dolgov et al. |
| 7,243,134 B2 | 7/2007 | Bruner et al. |
| 7,286,931 B2 | 10/2007 | Kawasaki |
| 7,315,259 B2 | 1/2008 | Sacks |
| 7,369,938 B2 | 5/2008 | Scholl |
| 7,421,334 B2 | 9/2008 | Dahlgren et al. |
| 7,486,199 B2 | 2/2009 | Tengler et al. |
| 7,571,042 B2 | 8/2009 | Taylor et al. |
| 7,626,490 B2 | 12/2009 | Kashima |
| 7,642,901 B2 | 1/2010 | Kato et al. |
| 7,653,481 B2 | 1/2010 | Tramel |
| 7,706,796 B2 | 4/2010 | Rimoni et al. |
| 7,726,360 B2 | 6/2010 | Sato et al. |
| 7,804,423 B2 | 9/2010 | Mudalige et al. |
| 7,818,380 B2 | 10/2010 | Tamura et al. |
| 7,822,380 B2 | 10/2010 | Wu |
| 7,822,546 B2 | 10/2010 | Lee |
| 7,826,945 B2 | 11/2010 | Zhang et al. |
| 7,894,592 B2 | 2/2011 | Book et al. |
| 7,920,969 B2 | 4/2011 | Mudalige et al. |
| 8,121,802 B2 | 2/2012 | Grider et al. |
| 8,145,376 B2 | 3/2012 | Sherony |
| 8,290,704 B2 | 10/2012 | Bai |
| 2001/0001847 A1 | 5/2001 | Hessing |
| 2002/0087262 A1 | 7/2002 | Bullock et al. |
| 2002/0152018 A1 | 10/2002 | Duckeck |
| 2003/0028320 A1 | 2/2003 | Niitsuma |
| 2003/0036848 A1 | 2/2003 | Sheha et al. |
| 2003/0040866 A1 | 2/2003 | Kawakami |
| 2003/0040868 A1 | 2/2003 | Fish et al. |
| 2003/0158652 A1 | 8/2003 | Friedrichs et al. |
| 2004/0021583 A1 | 2/2004 | Lau et al. |
| 2004/0117108 A1 | 6/2004 | Nemeth |
| 2004/0117113 A1 | 6/2004 | Friedrichs et al. |
| 2005/0085956 A1 | 4/2005 | Losey |
| 2005/0144573 A1 | 6/2005 | Moody et al. |
| 2005/0159881 A1 | 7/2005 | Furukawa |
| 2006/0025923 A1 | 2/2006 | Dotan et al. |
| 2006/0026335 A1 | 2/2006 | Hodgson et al. |
| 2006/0069504 A1 | 3/2006 | Bradley et al. |
| 2006/0089788 A1 | 4/2006 | Laverty |
| 2006/0145837 A1 | 7/2006 | Horton et al. |
| 2006/0168627 A1 | 7/2006 | Zeinstra et al. |
| 2006/0172745 A1 | 8/2006 | Knowles |
| 2006/0184314 A1 | 8/2006 | Couckuyt et al. |
| 2006/0190164 A1 | 8/2006 | Glaza |
| 2006/0241857 A1 | 10/2006 | Onishi et al. |
| 2006/0282214 A1 | 12/2006 | Wolterman |
| 2007/0005241 A1 | 1/2007 | Sumizawa et al. |
| 2007/0038362 A1 | 2/2007 | Gueziec |
| 2007/0050248 A1 | 3/2007 | Huang et al. |
| 2007/0093955 A1 | 4/2007 | Hughes |
| 2007/0104224 A1 | 5/2007 | Conner et al. |
| 2007/0143013 A1 | 6/2007 | Breen |
| 2007/0143482 A1 | 6/2007 | Zancho |
| 2007/0143798 A1 | 6/2007 | Jira et al. |
| 2007/0198172 A1 | 8/2007 | Sumizawa et al. |
| 2007/0203643 A1 | 8/2007 | Ramaswamy et al. |
| 2007/0203646 A1 | 8/2007 | Diaz et al. |
| 2007/0213092 A1 | 9/2007 | Geelen |
| 2007/0219706 A1 | 9/2007 | Sheynblat |
| 2007/0273624 A1 | 11/2007 | Geelen |
| 2007/0290839 A1 | 12/2007 | Uyeki et al. |
| 2008/0005734 A1 | 1/2008 | Poristoin et al. |
| 2008/0065318 A1 | 3/2008 | Ho |
| 2008/0082260 A1 | 4/2008 | Kimura |
| 2008/0114534 A1 | 5/2008 | Yamazaki et al. |
| 2008/0147305 A1 | 6/2008 | Kawamata et al. |
| 2008/0147308 A1 | 6/2008 | Howard et al. |
| 2008/0162034 A1 | 7/2008 | Breen |
| 2008/0195305 A1 | 8/2008 | Jendbro et al. |
| 2008/0228346 A1 | 9/2008 | Lucas et al. |
| 2008/0303693 A1 | 12/2008 | Link, II |
| 2009/0055091 A1 | 2/2009 | Hines et al. |
| 2009/0063042 A1 | 3/2009 | Santesson et al. |
| 2009/0083627 A1 | 3/2009 | Onda et al. |
| 2009/0143934 A1 | 6/2009 | Motonaga et al. |
| 2009/0177384 A1 | 7/2009 | Walder |
| 2009/0186596 A1 | 7/2009 | Kaltsukis |
| 2009/0192688 A1 | 7/2009 | Padmanabhan et al. |
| 2009/0196294 A1 | 8/2009 | Black et al. |
| 2009/0216434 A1 | 8/2009 | Panganiban et al. |
| 2009/0228172 A1 | 9/2009 | Markyvech et al. |
| 2009/0254266 A1 | 10/2009 | Altrichter et al. |
| 2009/0259354 A1 | 10/2009 | Krupadanam et al. |
| 2009/0326797 A1 | 12/2009 | Tengler et al. |
| 2009/0326801 A1 | 12/2009 | Johnson et al. |
| 2010/0010732 A1 | 1/2010 | Hartman |
| 2010/0048184 A1 | 2/2010 | Kim |
| 2010/0088018 A1 | 4/2010 | Tsurutome et al. |
| 2010/0088029 A1 | 4/2010 | Hu et al. |
| 2010/0094500 A1 | 4/2010 | Jin |
| 2010/0094550 A1 | 4/2010 | Tsurutome et al. |
| 2010/0138151 A1 | 6/2010 | Jang et al. |
| 2010/0174485 A1 | 7/2010 | Taylor et al. |
| 2010/0191463 A1 | 7/2010 | Berry et al. |
| 2010/0198508 A1 | 8/2010 | Tang |
| 2010/0217482 A1 | 8/2010 | Vogel et al. |
| 2010/0241342 A1 | 9/2010 | Scalf et al. |
| 2010/0245123 A1 | 9/2010 | Prasad et al. |
| 2011/0003578 A1 | 1/2011 | Chen et al. |
| 2011/0004523 A1 | 1/2011 | Giuli et al. |
| 2011/0028118 A1 | 2/2011 | Thomas |
| 2011/0046883 A1 | 2/2011 | Ross et al. |
| 2011/0166774 A1 | 7/2011 | Schunder |
| 2011/0178811 A1 | 7/2011 | Sheridan |
| 2011/0221586 A1 | 9/2011 | Eikelenberg et al. |
| 2011/0238289 A1 | 9/2011 | Lehmann et al. |
| 2011/0246016 A1 | 10/2011 | Vang et al. |
| 2011/0255481 A1 | 10/2011 | Sumcad et al. |
| 2012/0004841 A1 | 1/2012 | Schunder |
| 2012/0029806 A1 | 2/2012 | Scalf et al. |
| 2012/0029807 A1 | 2/2012 | Schunder et al. |
| 2012/0041673 A1 | 2/2012 | Vandivier et al. |
| 2012/0053825 A1 | 3/2012 | Schunder |
| 2012/0083932 A1* | 4/2012 | Ramaswamy et al. ........ 700/291 |
| 2012/0173134 A1 | 7/2012 | Gutman |
| 2013/0030630 A1 | 1/2013 | Luke et al. |

(56) References Cited

U.S. PATENT DOCUMENTS

FOREIGN PATENT DOCUMENTS

| | | |
|---|---|---|
| DE | 102010032229 | 1/2012 |
| EP | 1085299 | 3/2001 |
| JP | 2004021503 | 1/2004 |
| JP | 2005091193 | 4/2005 |
| JP | 20060337180 | 12/2006 |
| JP | 200964951 | 3/2007 |
| JP | 20080078696 | 4/2008 |
| JP | 20080162578 | 7/2008 |
| WO | 2008037471 A2 | 4/2008 |

OTHER PUBLICATIONS

International Searching Authority, The International Search Report and the Written Opinion of the International Searching Authority for the corresponding International Application No. PCT/US2010/23887 mailed Apr. 12, 2010.

Patent Cooperation Treaty, International Preliminary Examining Authority, International Preliminary Report on Patentability for the corresponding PCT/US10/23887 mailed Apr. 29, 2011.

Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.

Garmin Garage, Follow the Leader, www.garmin.com/garmin/cms/site/us, date unknown.

TomTom, portable car navigation systems, http://www.tomtom.com, Feb. 6, 2009.

MapQuest Maps—Driving Directions—Map, http://www.mapquest.com, Aug. 25, 2009.

Multi-Modal Navigation Tools, TDM Encyclopedia, Jan. 26, 2010.

Google Maps Finally Adds Bike Routes, Mary Catherine O'Connor, Mar. 10, 2010, printed from www.wired.com/autopia/2010/03/google-maps-for-bikes/.

POI Along Route Qs, Printed from http://www.tomtomforums.com, printed Jul. 30, 2010.

Difficult POI search in Streets & Trips, printed from http://www.laptopgpsworld.com/3520-difficult-poi-search-streets tips, printed Jul. 30, 2010.

http://www.rated4stars.com/html/gps-saves-gas.html, date unknown.

http://www.gps.cx/index.php?c=1&n=493964&i=B001LTHONU&x=GPS_Buddy_FE01US_Fuel_Economy_Software_Package, date unknown.

http://www.gpsmagaziine.com/2009/02/hands-on_with_garmins_new_ecor.php (Feb. 2009).

http://www.nrel.gov/vehiclesandfuels/vsa/pdfs/42557.pdf (Apr. 2008).

http://green.autoblog.com/2009/03/05/sentience-research-vehicle-shows-how-tons-of-data-can-save-milli/ (Mar. 2009).

http://reviews.cnet.com/8301-13746_7-10189749-48.html, date unknown.

Navigator—A Talking GPS Receiver for the Blind, Ryszard Kowalik and Stanislaw Kwasniewski, Gdansk University of Technology, 2004.

Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106, date unknown.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

* cited by examiner

METHOD AND APPARATUS FOR VEHICLE ROUTING

TECHNICAL FIELD

The illustrative embodiments generally relate to a method and apparatus for vehicle routing.

BACKGROUND

The availability and inclusion of navigational systems in vehicles has created a variety of opportunities with respect to driver navigation and routing. Drivers can be provided with a fastest route, a non-highway route, a fuel efficient route, etc. Navigational systems can be provided as part of a standard vehicle package, on a portable phone, or as standalone devices usable in a vehicle.

Through existing infotainment systems, such as the FORD SYNC system, vehicles computing systems can access cloud-based services. This can help integrate typically off-board computing services into a vehicle computing system. Through a connection established through, for example, a wireless device, a vehicle computing system can access a cloud-based computing system and bi-directionally communicate therewith.

The off-board computer, server, etc. can utilize resources not available locally at the vehicle such as increased computing power, database access, internet access, etc. and incorporate this available data/computing power into its processes. This can expand the range of options and opportunities available for provision of services at the vehicle.

SUMMARY

In a first illustrative embodiment, a computer implemented method includes receiving a vehicle route. The exemplary method further includes receiving data relating to a vehicle charge level. Also, the method includes estimating a power requirement required to travel the length of the vehicle route.

The method additionally includes contingent on a vehicle charge state being insufficient to meet the power requirement, comparing the vehicle route to power outage data to establish the presence of power outage regions along the vehicle route. Further, the method includes sending a warning for at least one portion of the route containing a power outage region to a vehicle computing system for relay to a driver.

In a second illustrative embodiment, a computer implemented method includes receiving a vehicle route and storing the vehicle route. The method also includes comparing the vehicle route to power outage data to establish the presence of power outage regions along the vehicle route, while a vehicle is traveling along the route. Further, the method includes sending a warning for at least one portion of the route containing a power outage region to a vehicle computing system for relay to a driver.

In a third illustrative embodiment, a computer implemented method includes receiving a vehicle route. The method also includes comparing the vehicle route to power outage data to establish the presence of power outage regions along the vehicle route. Further, the method includes sending a warning for at least one portion of the route containing a power outage region to a vehicle computing system for relay to a driver.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
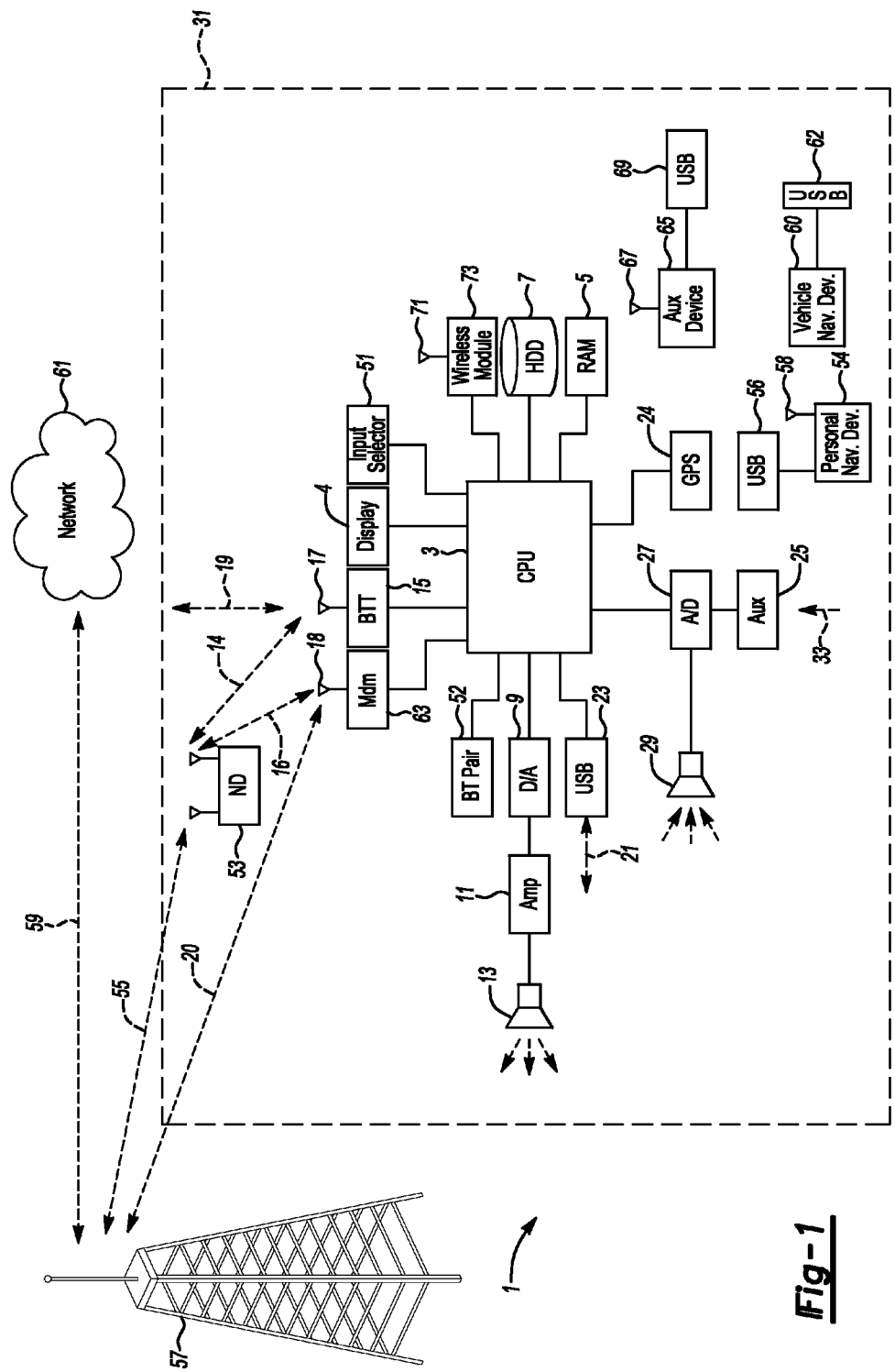
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

A primary concern of Battery Electric Vehicle (BEV) customers is the question of whether they can reach their destination on the charge available on their electric vehicle. This condition is commonly known as "charge anxiety." BEVs and other full or partially electric vehicles will often have some sort of range projection provided thereto, which allows a driver to see approximately how much range remains in the vehicle. Preferably, the driver will reach a destination, including a charging point, before the vehicle runs out of charge. If not, the driver will need to stop somewhere along the way to charge the vehicle.

While the driver must be somewhat aware of the current vehicle charge state (even more so than in a gas vehicle, due the relative infrequency of charging stations), it is likely that the driver will also be aware of local charging points so that routing need not always be within the range of a single charge. For example, if a driver needs to drive thirty miles to work, and a charging station is halfway between the driver and the office, the driver only need to have fifteen to twenty miles of charge in a vehicle when leaving the house or the office, and can stop and recharge in such a scenario. Regardless of the fact that this may add time to the commute, at least the driver has the option to recharge the vehicle.

Of course, if the driver were to reach the charging station and discover that the power was out, the driver would be in a difficult situation. Since there would likely not be enough charge to reach a next charging station, the driver would literally be stuck at that charging point for the duration of the blackout (barring towing). Or, if a driver had thirty five miles of charge in the above scenario and drove home without charging, only to discover the power was out at home (but on at the charging station), the driver may have insufficient time or capability to recharge the vehicle at home to travel to work the next day. Had the driver known of the outage, the driver could have stopped at the charging station along the way and put sufficient charge in the vehicle for the following day's travel.

Figure 2:
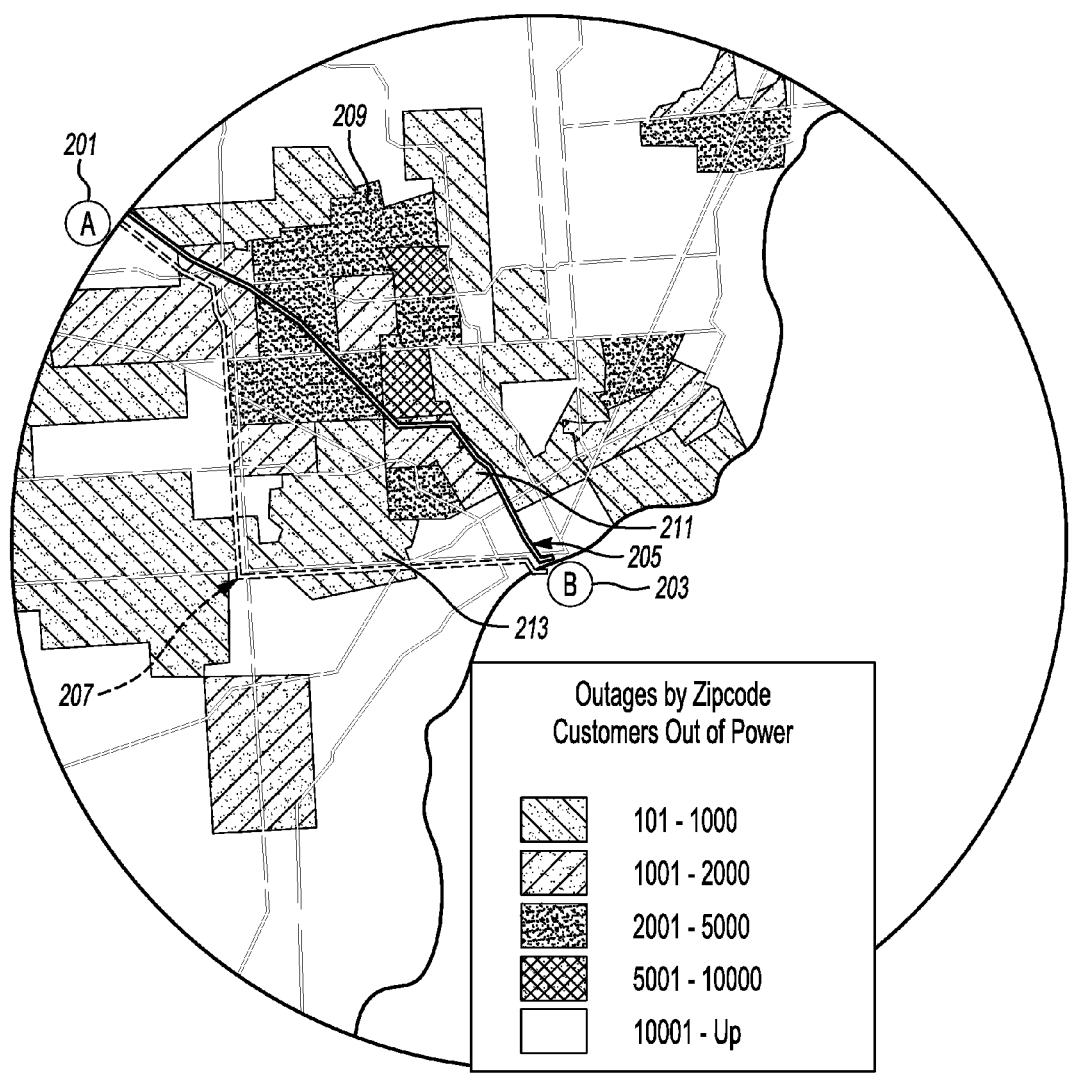
FIG. 2 shows an illustrative outage map.

FIG. 2 shows an illustrative outage map. This non-limiting example of a power outage map can be generated by a remote server and/or obtained, for example, from a power provider. In one illustrative example, a company, such as, but not limited to, an automotive OEM, can contact a power company or access a power company website or database for a list of outages. The information can come in the form of a map, data, etc.

If the information is data, it may include, but is not limited to, geofences around outage areas defining the outages. This information can be used to generate a map or simply utilized as datapoints to determine if routes pass through or end in outages.

If the information is a map, the OEM (supplier, vendor, data servicer, etc.) can determine geofencing from the map, or utilize other suitable methods to determine where outages exist. If the information is in an alternative form, it can be utilized as appropriate.

In this example, the map shows several usable pieces of information. In addition to outages, in this example, several routes have been overlaid on the map to define an exemplary "optimum charge route" versus an "optimum recharge availability route." Both routes extend from point A 201 to point B 203.

The first route is an optimum charge route 205, which may also include optimizations such as traffic, weather, and other fuel efficiency considerations. Additionally or alternatively, the route or another alternative route could be simply based on time efficiency. Other suitable "optimal" routes may be determined in conjunction with driver or manufacturer settings/desires/etc.

The second route here 207, is the optimal recharge route. This route can be employed if the vehicle is low on charge, if high traffic on the main route indicates that a driver may not be able to pass through the outage area(s) on the current charge, if the driver just wishes to be cautious, etc.

In addition, the map shows various outage areas 209, 211, 213. Outages are coded by affected customers, so that designations between high outage and low outage areas may be determined. If there were sufficient charging stations, it may even be possible to have charging stations reporting statuses online, such that the data could be used to determine if a given station or stations along a route were affected.

Figure 3:
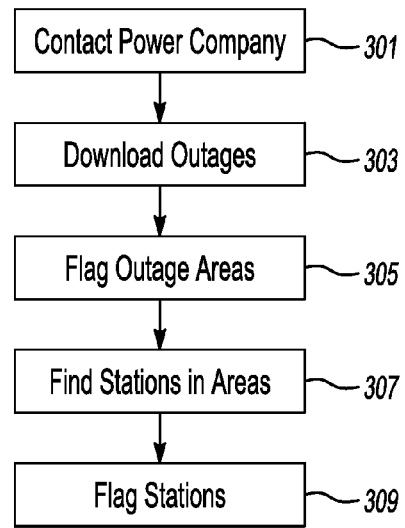
FIG. 3 shows an illustrative process for processing outages.

FIG. 3 shows an illustrative process for processing outages. In this illustrative embodiment, routing decisions, or at least outage routing decisions are made by a remote server. In another example, the data may be downloaded to a vehicle for processing in-vehicle.

In this illustrative example, the process contacts a power company or other data provider 301 to obtain current outage data 303. Additionally or alternatively, a constant connection could be established, or connections could be automatically established in the event of likely power outage conditions (e.g., triggered by blackouts, storms, high winds, snowfall, etc.).

Once the outages are downloaded, the process may flag one or more outage areas 305. The outage areas can be generally flagged, or can have severity flags associated therewith. For example, it may not be necessary or desirable to route a user around a large area affected by only a few spot outages. On the other hand, a cautious driver may wish to avoid all outage areas, in order to ensure that power supply is present throughout a journey.

Additionally, in this embodiment, a list of known recharging stations is compared to the outage areas 307. These can include commercial stations, known charging points and other spots where charging may be obtained. In this example, the charging stations are flagged 309 so that if a route was to suggest a recharge at a particular station or point, the routing engine would know with at least some degree of precision (e.g., without limitation, low, medium, high, etc.) whether or not the station was likely to be operational.

Currently, given the limited number of known charging stations and charging points, cross referencing charging points/stations with an outage grid can help in the determination of whether or not a vehicle should travel through an "outage" area. For example, if a relatively comprehensive list of stations/points is available, and there are none known to be along a particular optimal route, it would make little sense to route a user off of that route, since charging could not presumably be obtained in any event. On the other hand, if an alternative route would be recommended in any event, to obtain charging, it would be useful to know if there was an outage in the vicinity of a recommended charging point. Charging points may also include driver designated points (e.g., relatives, friends, etc.) where the driver has input a location as a charging point and/or the vehicle has previously charged (and thus possibly saved the location as a charging point).

Figure 4:
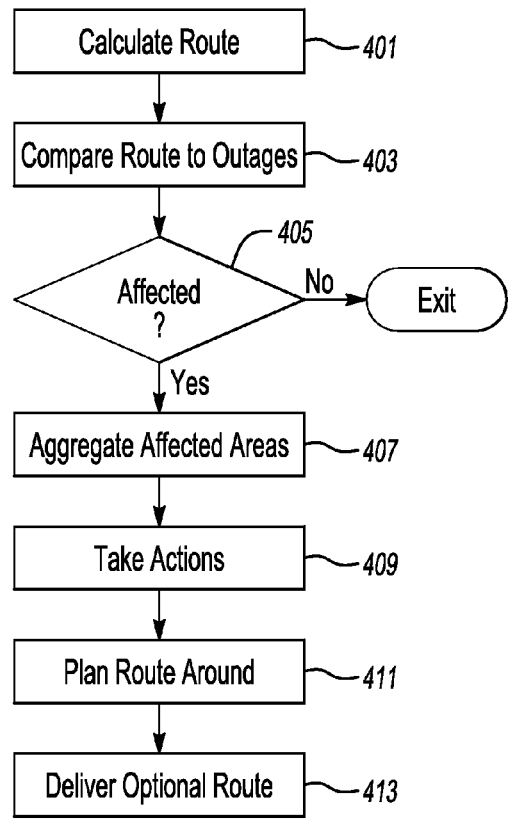
FIG. 4 shows an illustrative process for updating a route.

FIG. 4 shows an illustrative process for updating a route. Again, in this example, route calculation is done off-board of the vehicle, although this process could be performed by a navigation device (GPS device, smart phone, etc.) in communication with a vehicle computing system or by the vehicle computing system itself.

Once an optimal route (according to any desired parameters) has been calculated 401, the process compares the route to known outages 403. As previously noted, this can be done using geographic data (comparing points on the route to geofencing), by overlaying the route on a map showing outages, or by any other suitable technique. If there are no affected areas 405 (or no affected areas above a determined threshold) the process exits.

If there are affected areas along a route, the process aggregates the affected areas to determine what degree of re-routing is necessary 407. This is just one illustrative example of how outage areas may be handled. In another example, each outage area may be handled individually. In this example, all of the "threshold" areas along a route are designated as "no travel zones," "warning zones," etc., so that route recalculation avoids all areas without a need for repetitive routing. For example, without limitation, roads passing through these areas can be treated as if the roads terminate at the border of the affected area (if, for example, the affected area is a "no travel" area).

In addition, although not shown, if a recharge station is within a "safe" area not far from any affected area (or anywhere along a recommended re-route), the process can recommend a stop at the station and then potentially ignore any further no-travel spots, depending on whether or not the driver is expected (or indicates) that a charging stop will be made.

In addition to determining affected areas along a route, the process will take actions as needed 409. In one non-limiting example, at least "no travel" and "warning" zones exist. "No travel" zones will be routed around as needed, while "warning" zones may only generate a warning to the driver that stations within these zones are possibly not operational. If any no travel zones exist on the route, the process may proceed to route around 411 any zones where travel would be likely to result in an out-of-power condition. A new optimal route may then be delivered to the vehicle as determined by the system if needed 413.

Figure 5:
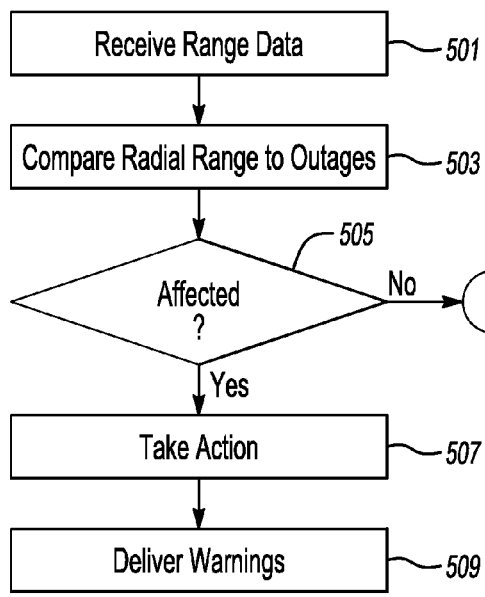
FIG. 5 shows an illustrative process for warning a driver.

FIG. 5 shows an illustrative process for warning a driver. In this illustrative example, it is not necessarily known where a driver is traveling. This may be a common scenario for many drivers traveling from a known point to a known point. The driver may not wish to input a specific route, or may not even be sure where a route will end (e.g., a shopping trip). In such a situation, it would be useful for a driver to be aware of a potential charging problem. For example, if a charge station was proximate to a shopping stop, the driver may wish to charge a vehicle while engaging in shopping. If the charge station was out of power, the driver may reach the destination only to discover that recharging is not available, and insufficient charge remains to return home.

In this illustrative example, the process (again, for exemplary purposes, running remotely), receives range data from a vehicle 501. The range data can dictate a maximum travel distance, an out-and-back travel distance, a radial travel distance based on road-speeds, traffic (e.g., if one direction is rural and another direction is urban), etc. To be safe, an additional margin of error may be built into the range data (for example, without limitation, subtract X % from the projected range to account for unknown energy consumption). The radial travel range (or other suitable measurement of travel range) can then be compared to known outages 503.

In at least one example, if charging stations are present and/or prevalent in an area, a maximum travel range may be initially used (designating a range where a vehicle can travel until power is depleted) and then the calculation may be adjusted to a more conservative estimate (e.g., without limitation, an out-and-back range) if there is significant power outage in the original radius.

Once the general travel range has been selected, it is determined if there are any affected areas within a likely travel area 505. This process, as noted above, may also be a recursive process, to help ensure that a driver does not encounter a no-charge situation.

If there is one or more affected areas within the projected travel range, appropriate action may be taken. Actions include, but are not limited to, warning a driver generally of outages, warning a driver of areas to avoid, repeatedly checking outages as a driver travels to ensure a no-power area is not being entered on a low charge, etc. Any suitable warnings may then be delivered to the driver as necessary 509.

In one example, if charging locations are known/accessible, the process may determine that a driver is approaching a no-power or high-outage area (or any suitable threshold region). The process could determine, for example, that a likely-powered charging station is three miles from a driver's current location, and that, if the driver travels more than X miles in the current direction, the likelihood of recharge or returning to a known/likely working charging station is very low. In such an instance, the process may alert the driver that the driver is approaching a point of no return, wherein charging should be obtained before traveling any further in the current direction lest the driver reach a point where no charging can be/can likely be obtained.

Figure 6:
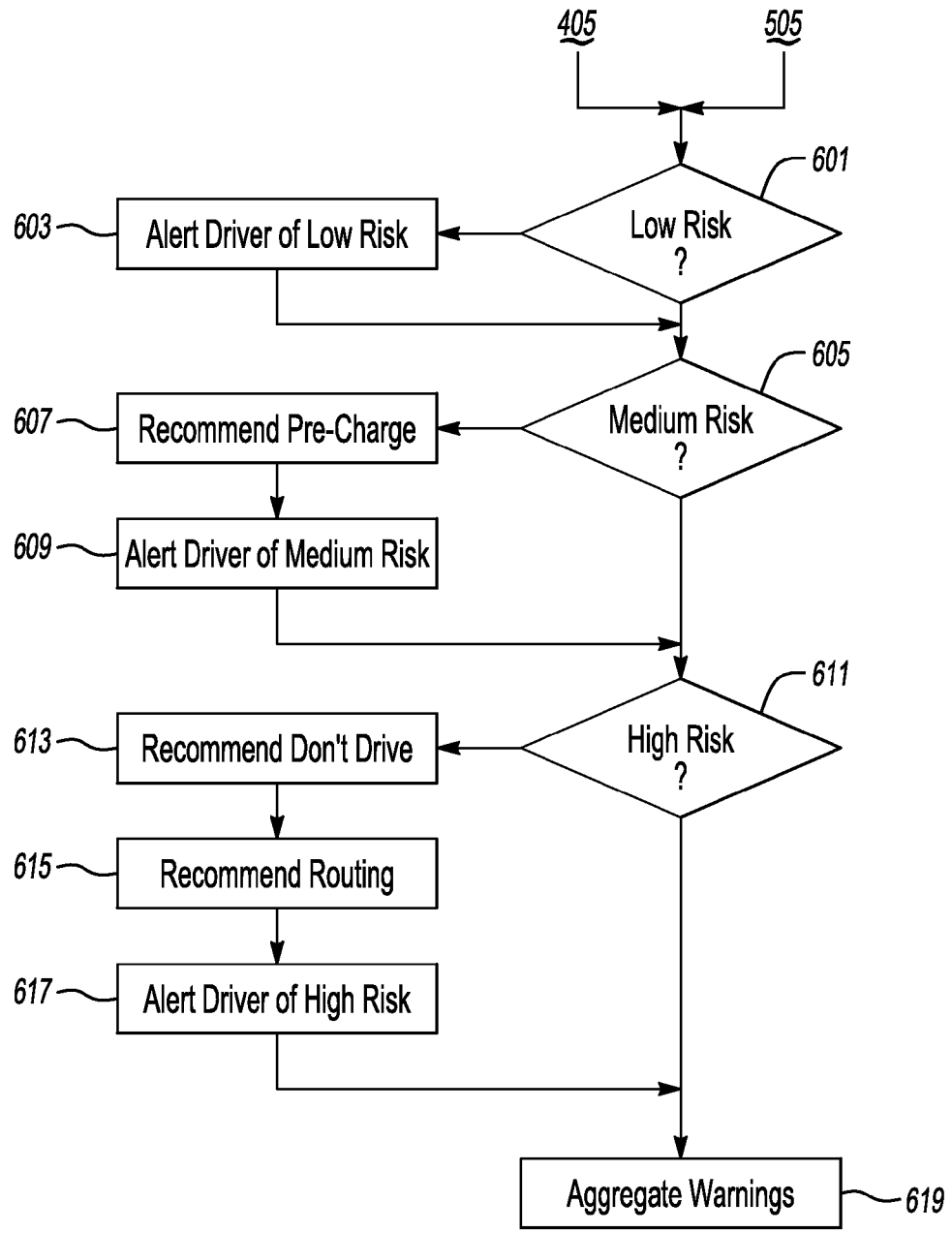
FIG. 6 shows an illustrative process for route handling.

FIG. 6 shows an illustrative process for route handling. In this illustrative example, different actions a process can take based on differing outage scenarios are shown in a non-limiting embodiment. These examples are merely exemplary and are not intended to limit the scope of the invention in any fashion.

In this illustrative process at least one area of possible driver interest has been noted as shown, in illustrative example, in elements 405 and/or 505. In this embodiment, the "first cut" analysis reveals that some portion of a driver's route passes through an area in which at least some level of power outage is indicated.

The levels of concern in this embodiment are low, medium and high, although these demarcations are chose for illustrative purposes only. More specific designations can be selected, or broader generalizations can be used if desirable. Actions in accordance with a known/detected power outage risk can then be taken.

In this example, the process determines if the affected area along the route (and the process can repeat until all affected areas have been considered) is a low risk area 601. Low risk may correspond, for example, to only a few outages (as indicated by data from the power company) or a low percentage of outages (as indicated by data from the power company), or any other suitable data indicating that it is still reasonably likely that an encountered recharging station will have power.

If there is a low risk, in this example, a driver will be alerted of the condition 603. In this example, all the alerts for all areas along a route are aggregated 619 so that a comprehensive list of warnings and routing suggestions can be delivered to a driver. The alert(s) can include a percentage/number of outages and any other reasonable data.

In at least one example, if the locations of charging points (commercial or private points used by a driver previously or otherwise indicated) are known, it may only be relevant to inform a driver of an outage if there is a charging point within the outage area. I.e., if there is no charging point in the outage area, the driver would not be able to stop in that area to recharge regardless of whether or not there was a power outage, so the power outage is of little concern to a driver's ability to recharge. On the other hand, drivers may want to know about all outages along a route, in case they are aware of a station of which the computer is not aware, or if they need to make an emergency stop, etc.

Once the alert warnings have been noted for one or more low risk areas, the process checks to see if there are any medium risk areas along a route 605. Medium risk areas, in this example, may correspond to a higher percentage or number of outages and introduce a higher likelihood that a particular station or charging point will not have power. Again, this information may, in one example, only be presented for the areas in which a known charging point or charging station exists.

In this embodiment, since there is a higher possibility of the driver not being able to recharge along a route in a medium risk area, the process may recommend a pre-charge of at least some level 607. This could correspond to charging a vehicle until an estimated amount of power required to reach to a known, usable charging point is obtained; until an estimated amount of power to reach a destination is obtained, etc.

In addition to possibly recommending a pre-charge, especially if a vehicle is low on power, the process may also add one or more warnings to the warning/suggestion aggregate 609. These warnings could differ in severity from the low risk warnings, and could provide the driver with additional information about the medium risk outages.

Also, in this example, the process checks for any areas where there is a high risk of charging points having no power 611. This could correspond to any areas where the risk is above a medium point and it is reasonably likely that a charging station/point will not have power if the driver desires to stop there. In this example, several potential specific warning conditions can be accounted for. In one instance, a "don't drive" warning may be sent to the driver 613. This could be, for example, if the route is long enough that at least one stop must be made, regardless of initial charge state, and significant portions of the route are covered in high risk zones. For example, if a vehicle has a range of four hundred miles, and a six hundred mile journey through a region of heavy snowfall, outages and winter storms is planned, the driver will have to stop at least once. If the middle four hundred miles of the route is blanketed in high outage zones, or even if only known charging points along the route all lie in high outage zones, the process may recommend that the driver not drive until a later time.

In another example, the process may recommend a new route 615 that avoids the riskiest area(s) along the route. Re-routing can be done such that a new route is found avoiding high outage areas as much as possible, while at the same time attempting to minimize travel time and, if desired, provide the user with at least one recharge point in a low or no risk zone in case of emergency. In another example, not shown, re-routing could even be recommended with regards to medium risk or low risk zones, so that a known charging point of at least one level lower is included in a route.

Re-routing may be attempted by a routing engine, and if no possible route is available the process may return to recommending "don't drive," or at least a pre-charge, in the case that the distance along the route (plus any known delays) is less than the total maximum range (i.e., short enough that a vehicle charged to some level can travel the entire route).

Warnings to the driver may also be added in the high risk instances 617. If desired, these warnings could be severe in nature and designed to ensure that the driver pays attention to them, at least more so than the lesser warnings associated with other lower risk areas. Once all warnings for all desired zones have been added, the warnings are aggregated 619 for delivery to the vehicle. The data delivered to the vehicle can also include any recommended reroutings or power pre-charging.

Data can also be included in a conditional form. For example, if a re-route is recommended, and the driver elects not to re-route, then information recommended a pre-charge can be presented. If the driver elects to follow the re-route suggestion, the information pertaining to the pre-charge can be ignored, in this example, since the driver will be traveling through a zone where charging is possible.

In at least one illustrative embodiment, in addition to receiving the data and providing re-routes and/or warnings at the inception of a journey, a remote server can store route data at least temporarily. As power outages are updated, the server can compare updated outages to stored route data for a plurality of vehicles. If certain outage changes affect vehicle routes, the server can take appropriate action (in accordance with the described illustrative embodiments) and send warnings, re-routes, etc. corresponding to the newly available data. This can help drivers re-route around new outages or stop and charge a vehicle earlier than may have been planned if the driver is approaching an area along a route that is in an outage state and power may be insufficient to carry the driver through the area.

While the above examples have been given with respect to electric vehicles, the techniques described and taught herein could also be applied to vehicles utilizing gasoline for fuel. In such an instance, the "charging points" referred to above would instead correspond to gas stations or other refueling options, including, but not limited to, replacement of fuel cells/packs, hydrogen, natural gas, liquid nitrogen, compressed air, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer implemented method comprising:
    receiving a vehicle route;
    receiving data relating to a vehicle charge level;
    estimating a power requirement required to travel a length of the vehicle route;
    contingent on a vehicle charge state being insufficient to meet the power requirement, comparing the vehicle route to power outage data to establish power outage regions along the vehicle route; and
    sending a warning for at least one portion of the route containing a power outage region to a vehicle computing system for relay to a driver.

2. The method of claim 1, wherein the route is transferred by request of a vehicle computing system.

3. The method of claim 1, wherein the warning includes a recommendation to re-route around at least one power outage.

4. The method of claim 3, wherein the warning includes a new, recommended route.

5. The method of claim 1, wherein the warning includes a recommendation to charge the vehicle to at least a predetermined level prior to continuing a journey.

6. The method of claim 1, wherein the comparing includes comparing the vehicle route to power outage data to establish power outage along the vehicle route, wherein the power outage regions are also examined to establish known charging points.

7. The method of claim 6, wherein the sending a warning includes sending a warning for only the at least one portion of the route containing a power outage region(s) also containing a known charging point.

8. A computer implemented method comprising:
    receiving a vehicle route;
    storing the vehicle route;
    while a vehicle is traveling along the route, comparing the vehicle route to power outage data to establish power outage regions along the vehicle route; and
    sending a warning for at least one portion of the route containing a power outage region to a vehicle computing system for relay to a driver.

9. The method of claim 8, further comprising:
    periodically receiving updates to power outage data from a power provider.

10. The method of claim 9, wherein the comparing further comprises comparing the vehicle route to updated power outage data.

11. The method of claim 8, wherein route data is stored temporarily until an indication that a route has been completed has been received or a predetermined time period has passed.

12. The method of claim 11, wherein the predetermined time period varies with a length of a route.

13. The method of claim 8, further comprising:
receiving updated route data while a vehicle is traveling along the route; and
replacing a stored vehicle route with the updated route data.

14. A computer implemented method comprising:
receiving a vehicle route;
comparing the vehicle route to power outage data to establish power outage regions along the vehicle route; and
sending a warning for at least one portion of the route containing a power outage region to a vehicle computing system for relay to a driver.

15. The method of claim 14, wherein the route is transferred by request of a vehicle computing system.

16. The method of claim 14, wherein the warning includes a recommendation to re-route around at least one power outage.

17. The method of claim 16, wherein the warning includes a new, recommended route.

18. The method of claim 14, wherein the warning includes a recommendation to charge the vehicle to at least a predetermined level prior to continuing a journey.

19. The method of claim 14, wherein the comparing includes comparing the vehicle route to power outage data to establish power outage along the vehicle route, wherein the power outage regions are also examined to establish known charging points.

20. The method of claim 19, wherein the sending a warning includes sending a warning for only the at least one portion of the route containing a power outage region(s) also containing a known charging point.

* * * * *